Aug. 4, 1964 F. P. MURPHY ETAL Re. 25,629

METHOD OF SHRINKING, DYEING AND FINISHING

Original Filed June 24, 1960

INVENTORS
Frank P. Murphy
BY Henry Kline
ATTORNEYS

United States Patent Office

Re. 25,629
Reissued Aug. 4, 1964

25,629
METHOD OF SHRINKING, DYEING AND FINISHING

Frank P. Murphy, 1813 N. 2nd St., Philadelphia 23, Pa., and Henry Kline, 913 E. Adams Ave., Philadelphia 24, Pa.

Original No. 3,083,074, dated Mar. 26, 1963, Ser. No. 38,554, June 24, 1960. Application for reissue Apr. 29, 1963, Ser. No. 276,681
2 Claims. (Cl. 8—18)

Matter enclosed in heavy brackets [ ] appears in the original patent but forms no part of this reissue specification; matter printed in italics indicates the additions made by reissue.

The present invention relates to method of preshrinking, dyeing and finishing garments made of knitted fabric.

A purpose of the invention is to produce a finished garment from knitted fabric such as cotton Jersey cloth which is stable against further shrinkage on washing.

A further purpose is to obtain a softer and more relaxed hand or feel on knitted garments.

A further purpose is to produce a garment from knitted fabric which will be more comfortable to the wearer and free from the scratchy feeling which has been produced by such garments in the past.

A further purpose is to produce garments from knitted fabric which have a more relaxed appearance and more uniform stitch distribution.

Further purposes appear in the specification and in the claims.

In the drawings we illustrate mechanism which will be useful in performing the process of the invention.

Considerable difficulty has been encountered in the dyeing and finishing of knitted fabrics and especially cotton Jersey cloth of the character which is primarily used for underwear such as undershirts and shorts, and for outer wear such as sport shirts, jackets and other similar garments.

The usual practice has been to dye and finish the cloth in the form of piece goods under tension in a jig or a dye beck.

The resulting finished garment has exhibited considerable tendency for further shrinkage, leading to distortion and misshaping after one or more washings.

Also the fabric produced in the prior art has had a rather stiff or harsh feel, and there has been some tendency of the garment or cloth to be scratchy or otherwise uncomfortable to the wearer.

There has also been a tendency for the stitches to be nonuniform in the finished garment or cloth due to uneven shrinkage effects.

In accordance with the present invention an improved preshrinking, dyeing and finishing technique is applied which results in a number of different advantages.

In the first place the tendency of the finished fabric to further shrinkage is largely eliminated, so that on subsequent washing the fabric will have a shrinkage in any case not over 1% in either direction. This results in a very relaxed appearance of the fabric with uniform knitted stitches in both directions.

One of the advantages of the present invention is that the garment and the cloth are more relaxed in hand or feel and softer, and the resulting garment is more comfortable and less likely to feel scratchy or otherwise uncomfortable to the wearer.

The finished garment of the invention may be washed repeatedly without any tendency to get wider or shorter or vice versa, and without any other tendency to distort in shape.

In accordance with the invention the dyeing and finishing are carried out with the garments or fabrics completely relaxed and contained in mesh or other suitable dyeing bags. As distinguished from the prior art, there is no tension whatever applied during dyeing or finishing.

Furthermore, in accordance with the invention, after dyeing and finishing the garments or fabric are tumbled to dry them and to work the fabric, thus resulting in increased softness and much greater comfort to the wearer.

Figure 1:
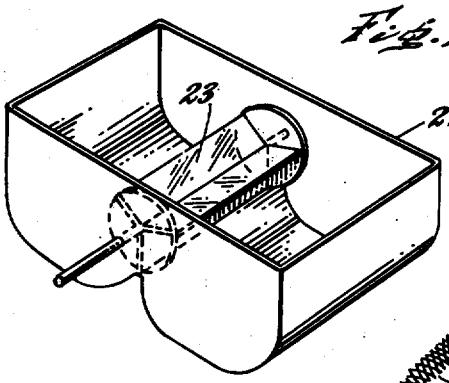
FIGURE 1 is a diagrammatic perspective of a conventional paddle dyeing machine useful in the invention.
Figure 1A:
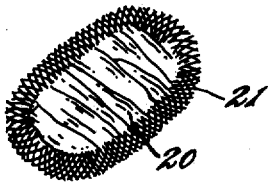
FIGURE 1a is a perspective of the work in a mesh bag.
Figure 2:
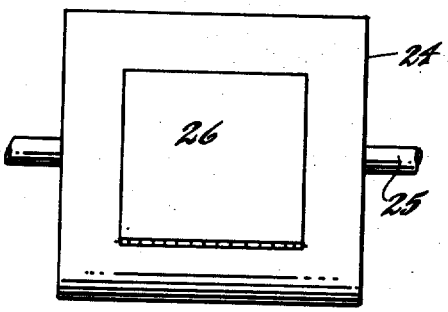
FIGURE 2 is a diagrammatic front elevation of a suitable cylindrical tumbling mechanism applicable in the invention.

Considering now the drawings in detail, the garments 20 of the invention as shown in FIGURE 1a are first placed in mesh bags 21, each of which desirably contains about 20 pounds of knitted fabric or garments (maximum).

A scouring bath is then made up in a conventional paddle dyeing machine 22 having power operated paddle 23 as well known, rotated by a suitable drive on a suitable horizontal axis.

The scouring bath consists of water to which a scouring detergent has been added, capable of removing waxes, impurities, knitting oils and other foreign matter. While conventional cleaning agents such as sodium and potassium soaps may be used, it is decidedly preferable to use a long chain fatty alcohol having a carbon chain length of between 14 and 30 carbon atoms, such as lauryl alcohol, myristyl alcohol, cetyl alcohol, stearyl alcohol, palmityl alcohol or oleyl alcohol.

The concentration of the detergent should be about 1 to 6 percent on the weight of the goods, preferably about 4 percent, and the ratio of the bath should be about 30 to 1 (times the weight of the goods). The temperature of the scouring bath should preferably be between about 160 and 190 degrees F.

During scouring the propeller of the machine churns the loose mesh bags containing the goods and agitates the goods and circuates the bath through the fabric.

After scouring is complete the bath is dropped.

After completion of the scouring, a rinse bath of water at a temperature between about 130 and 170° F. is made up having the same volume as the scouring bath and the machine is run to circulate the rinse bath with respect to the goods in the mesh bags. The function of the rinse bath is particularly to remove alkali. The rinse bath is then dropped and if the rinse bath has been substantially clean it will not be necessary to use a second rinse, but if the rinse bath has not been clean a second rinse bath will be made up and the machine run with the second rinse bath. Usually one rinse bath is sufficient.

Next a water bath for dye is made up, and a suitable dye is introduced such as a direct dye of which the following are examples.

Solontine Yellow RL (Color Index No. Direct Yellow 50)
Solontine Blue 2 GL (Color Index No. Direct Blue 81)
Solontine Orange G (Color Index No. Direct Orange 34)
Solontine Blue Green FWL (Color Index No. Direct Green 27)
Solontine Red 8 BLN (Color Index No. Direct Red 80)
Solophenyl Blue 3 GL (Prototype No. 443)

The concentration of dye will be between about 0.10 and 1.0% on the weight of the goods.

The fabric is run in the dye bath, the propeller of the machine circulates the bath and the bags of fabric relatively to one another so that fabric takes up the dye uniformly.

After completion of the dyeing, the dye bath is dropped.

Next a rinse bath as previously described is made up having a temperature between 90 and 100° F. and the propeller is operated to circulate the fabric in the bags with respect to the water of the rinse bath and remove excess dye. The first rinse bath is dropped and if it did not come up fairly clean, rinsing will be repeated until the rinse bath is clean.

Next a water bath to contain finish is made up. This bath has the same volume as that previously described, and will contain a cationic type of finish, preferably an amide of a fatty acid having a carbon chain length between 14 and 30, such as stearyl amide, palmityl amide, lauryl amide, myristyl amide or cetyl amide. The concertration of amide of fatty acid will preferably be in the range between 2 and 3% on the weight of the goods. The machine is run to thoroughly circulate the finish through the goods so that the goods will take up the finish, the finish bath is dropped and the goods are removed in the bags and extracted as by a centrifuge to remove the excess of water.

The goods are then removed from the bags, and this step is quite important. The loose fabric or clothing is then tumbled in a tumbling machine or drum 24 rotating on shafts 25 and having a suitable door 26. The tumbling machine turns about 6 to 10 r.p.m. and suitably has a diameter of about 4 to 10 feet.

The effect of the tumbling is to dry the good and also relax the fibers and relax and equalize the stitch, removing any localized tensions which may exist in the fabric so that the fabric comes up more uniform in appearance and is more soft and relaxed in respect to the hand or feel.

The times of the various operations will suitably be as follows:

| | |
|---|---|
| Scouring | 15 minutes to an hour and preferably about 30 minutes. |
| Rinsing | 5 minutes to an hour and preferably about 10 minutes. |
| Dyeing | 1 to 3 hours and preferably about 2 hours. |
| Finishing | 15 minutes to an hour and preferably about 30 minutes. |
| Extraction | 5 to 20 minutes and preferably about 10 minutes. |
| Tumbling | 30 minutes to 2 hours and preferably about 1 hour. |

The following is a detailed example of a preferred embodiment of the invention, indicating the time, temperature, materials and concentration of chemicals involved in each step according to the preferred procedure.

500 pounds of knit Jersey cloth is placed in mesh bags, 12 pounds of the knit Jersey cloth in each bag. A scouring bath is made up in a paddle wheel dyeing machine, having a bath ratio of 30 to 1 and containing 3% of sodium palmitate soap in water on the weight of the goods. This same bath ratio is used in all of the wet treatments referred to below. The goods in the bags is placed in the scouring bath and the machine is run for thirty minutes. The temperature of the scouring bath is 160° F. The bath is dropped. Two successive water rinses are made up at 160° F. and each is run for about ten minutes and then dropped.

A water bath of dye is then made up containing ¼% on the weight of the goods of Solontine Yellow RL (Color Index No. Direct Yellow 50) and this bath is run in the machine with the bags of goods at boiling temperature for two hours.

The dye bath is then dropped and a water finishing bath is made up containing 2% on the weight of the goods of stearyl amide at a temperature of 100° F. The machine is run with this bath in contact with the bags of goods for 15 minutes and then the bath is dropped.

The bags of goods are then transferred to a centrifuge and then extracted for about ten minutes.

The bags are then opened and the loose goods, immediately thereafter, in the sense that the goods are brought through the process from the scouring bath, are not yet fully dry, are placed in a tumble drum and rotated at approximately 8 r.p.m. for about 40 minutes. An extremely soft, relaxed product is obtained, with possibility of future shrinkage so far removed that the finished garments would never have over 1% shrinkage. As pointed out hereinbefore another effect of the tumbling is to dry the goods.

When reference is made herein to knitted goods, it is intended to designate knitted goods of the type used for underwear and for jackets such as cotton Jersey cloth, and is not intended to include hosiery.

In view of our invention and disclosure variations and modifications to meet individual whim or particular need will doubtless become evident to others skilled in the art, to obtain all or part of the benefits of our invention without copying the structure and process shown, and we, therefore, claim all such insofar as they fall within the reasonable spirit and scope of our claims.

Having thus described our invention what we claim as new and desire to secure by Letters Patent is:

1. The process of dyeing, preshrinking and finishing [garments of] cotton [Jersey] *jersey* cloth *for use in garments,* which comprises placing the [garments of] cotton [Jersey] *jersey* cloth in bags, making up a scouring bath in a paddle wheel dyeing machine, placing the bags of the [garments of] cotton [Jersey] *jersey* cloth in said paddle wheel dyeing machine, agitating the scouring bath and the [garments of] cotton [Jersey] *jersey* cloth in the bags by running the paddle wheel while the bags of [garments of] cotton [Jersey] *jersey* cloth are in the scouring bath and thereby scouring the [garments of] cotton [Jersey] *jersey* cloth, dropping the scouring bath, rinsing the [garments of] cotton [Jersey] *jersey* cloth in the paddle wheel dyeing machine, making up a dye bath in the paddle wheel dyeing machine and agitating the [garments of] cotton [Jersey] *jersey* cloth by running the paddle wheel while the bags of [garments of] cotton [Jersey] *jersey* cloth are free in said dye bath, dropping said dye [baths] *bath,* rinsing the [garments of] cotton [Jersey] *jersey* cloth, making up a finishing bath in said paddle wheel dyeing machine containing a cationic finish, agitating said [garments of] cotton [Jersey] *jersey* cloth by running said paddle wheel while the [garments of] cotton [Jersey] *jersey* cloth [are] *is* in said finishing bath, extracting the moisture from said [garments of] cotton [Jersey] *jersey* cloth, removing the [garments of] cotton [Jersey] *jersey* cloth from said bags, and immediately thereafter tumbling the [garments of] cotton [Jersey] *jersey* cloth free from the bags until [they are] *said cloth is* dry.

2. The process of claim 1, in which said finishing bath essentially comprises an amide of a long chain fatty acid having from 14 to 30 carbon atoms in the carbon chain.

References Cited in the file of this patent or the original patent

UNITED STATES PATENTS

| | | |
|---|---|---|
| 2,094,501 | Schmitz | Sept. 28, 1937 |
| 2,678,868 | Drum | May 18, 1954 |

OTHER REFERENCES

Unwin: J. Soc. Dyers and Col., 1948, pp. 245–258.

Marsh: An Introduction to Textile Finishing, 1948, pp. 240–256, 270–273, published by Chapman and Hall Ltd., London, England.

Technical Manual and Year Book of the American Association of Textile Chemists and Colorist, 1957, vol. 33, pp. 348–349.